April 27, 1954     F. L. COX     2,676,814
TOBACCO LEAF TRANSPORTING VEHICLE
Filed Oct. 6, 1952     2 Sheets-Sheet 1
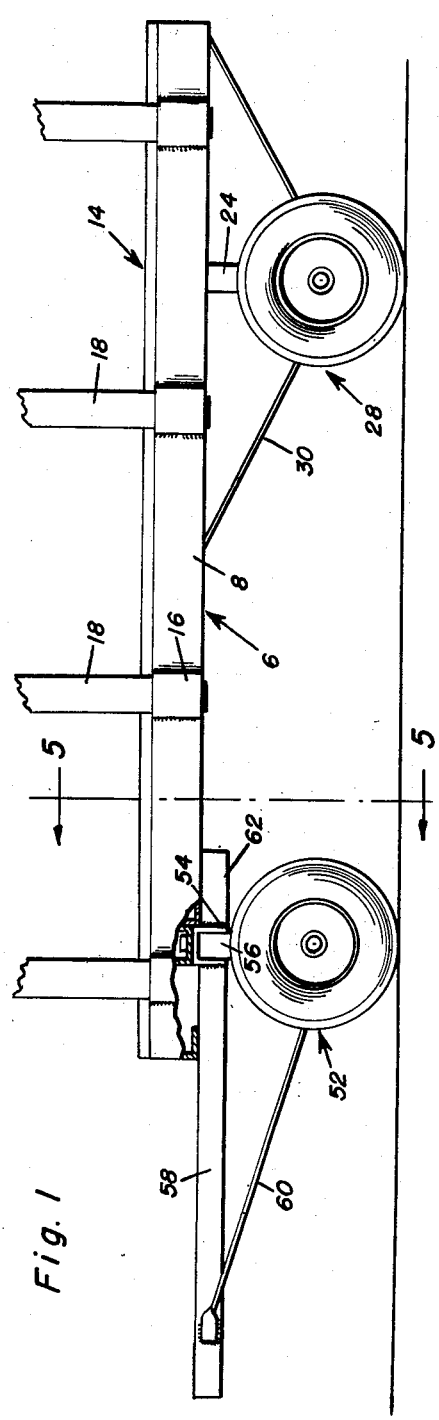
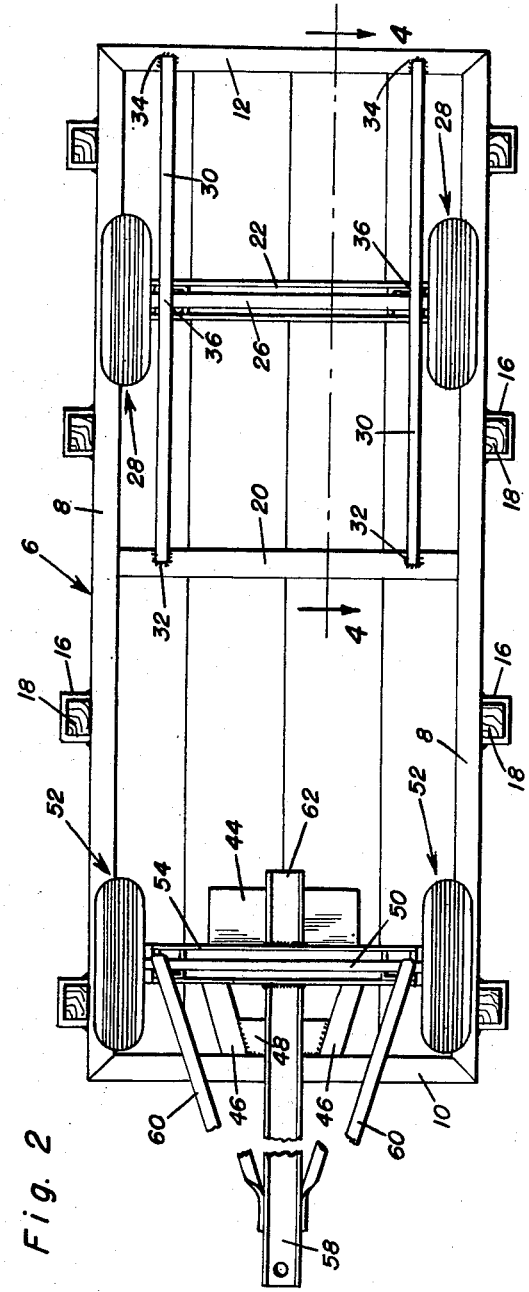
Frederic L. Cox
INVENTOR.

April 27, 1954
F. L. COX
2,676,814
TOBACCO LEAF TRANSPORTING VEHICLE
Filed Oct. 6, 1952
2 Sheets-Sheet 2
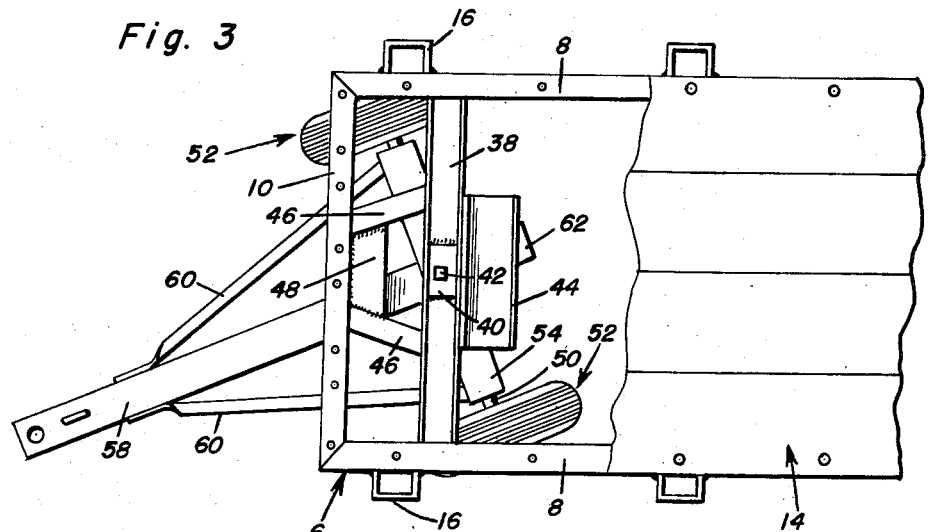
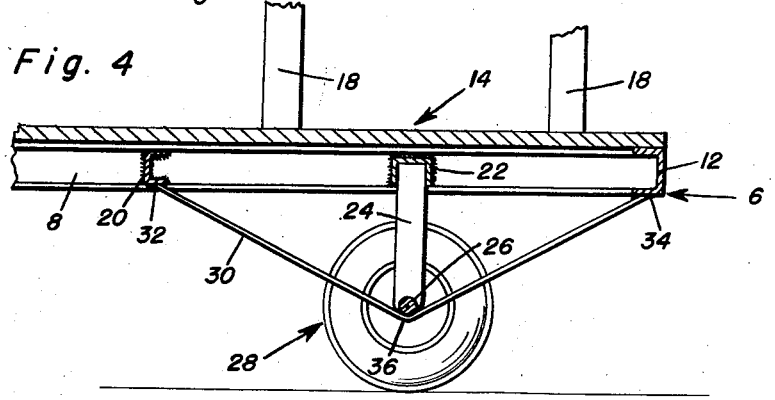
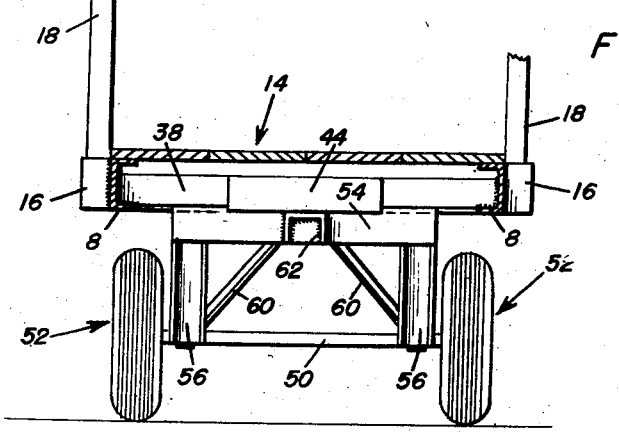
Frederic L. Cox
INVENTOR.

Patented Apr. 27, 1954

2,676,814

UNITED STATES PATENT OFFICE 2,676,814

TOBACCO LEAF TRANSPORTING VEHICLE

Frederic L. Cox, Grifton, N. C.

Application October 6, 1952, Serial No. 313,245

2 Claims. (Cl. 280—80)

The present invention relates to a wheel supported tongue-equipped vehicle of comparatively low height which, while employed for general utility purposes, is especially adapted and ideal for use on tobacco plantations for transporting leaf tobacco from the field to a tobacco drying and curing barn.

It is a matter of common knowledge that relatively narrow spaces are provided in tobacco growing fields to accommodate the movement of conveyances and vehicles to assist the pickers and other workmen in gathering and transporting stacked tobacco leaves from the field to a curing barn or elsewhere. For the most part, makeshift and handmade vehicles are currently in use for the purposes stated. For unknown reasons vehicles specially manufactured for this kind of work are, evidently, not on the market and hence it has been a general custom to utilize whatever trucks and vehicles are at hand at the time. It is the general observation, however, that a typical or average leaf transporting vehicle is handily made up on the farm. This means, therefore, that the so-called average vehicle is crude and most often is constructed from wooden parts unsatisfactorily nailed or bolted together and in no time at all the vehicle becomes unstable and the swivelly mounted tongue-equipped front wheels wobble and become so out of control that satisfactory steering, pushing, and pulling is not only unsatisfactory but is exasperating to say the least.

It will be evident, therefore, that there is apparently a good market for well constructed and comparatively expensive vehicles in the line of endeavor under consideration. It is an object of the instant invention to provide users with a strong, reliable, easy-to-handle special vehicle, useful in many other ways, in which manufactures and users will find their requirements and needs satisfactorily met.

In carrying out the aims in the instant solution of the problem a significant objective is to construct and thus provide a vehicle of suitable design and character wherein all of the structural components or parts are readily available on the open market and are cut and measured to fit together and are of metal and organized and assembled by welding them together in proper relationship.

More specifically, the desired end result is attained through the medium of pieces of scrap metal and channel irons.

One phase of the invention has to do with a horizontal frame member embodying longitudinal side members and interconnecting transverse front and rear members all coplanar with each other, tongue-equipped front wheel means situated beneath the front end of the frame and operatively joined thereto by way of a fifth wheel connection, forward and rearward rigid cross-members disposed horizontally between and secured to the side members of said frame and disposed in spaced parallelism in respect to each other and the rear transverse member of said frame, a pair of V-shaped trusses affixed at rear ends to the rear frame member and at their forward ends to the forward cross-member, an axle underlying the rearward cross-member and seated and secured fixedly in the respective vertex portions of said trusses, rigid vertical struts interposed between the end portions of said axle and corresponding end portions of said last named cross-member and affixed thereto, and wheels mounted for rotation on the respective end portions of said axle.

Another equally important phase of the invention has to do with a relatively long narrow low lying conveniently usable vehicle which is characterized by a horizontal frame, rear wheel means rollably supporting and attached to the rear end of said frame, said frame embodying spaced parallel longitudinal side members and an interconnecting transverse front member, a horizontal cross-member spanning the space between and secured at its ends to the respective side members and coplanar with the latter and said front member and spaced in rearward parallelism in respect to said front member, an axle, wheels mounted for rotation on said axle, a bolster fixed to said axle and having a portion underlying and pivotally joined to the intermediate portion of said cross-member, and a draft tongue carried by said bolster.

Other objects and advantages and specific structural adaptations will become more readily apparent from the following description and the accompanying sheet of illustrative drawings.

In the accompanying drawings wherein like numerals are employed to designate like parts throughout the views:

Figure 1 is a side elevational view of a tobacco leaf transporting and general utility vehicle constructed in accordance with the principles of the present invention.

Figure 2 is a bottom plan view of the same.

Figure 3 is a fragmentary top plan view with portions of the platform broken away to expose the parts thereberneath.

Figure 4 is a fragmentary section on the longitudinal line 4—4 of Figure 2, looking in the direction of the arrows.

Figure 5 is a transverse view taken on the vertical line 5—5 of Figure 1, looking in the direction of the arrows.

The frame, which is preferably rectangular in outline, is denoted generally by the numeral 6. It is made up of a pair of spaced parallel longitudinal side members 8—8, a transverse front member 10 and a transverse interconnecting rear member 12. All of these members are channel irons with their mitered ends butted and welded together in the manner shown. A platform 14 is made up of planks or the like and is bolted or otherwise superimposed on and fastened to the frame members. If desired, socket members 16 may be attached to the web portions of the side channel irons to accommodate insertable and removable wooden or equivalent stakes 18.

With reference to the rear wheel means and looking at Figures 2 and 4 it will be seen that a front cross-member 20 is provided and this is horizontal and fitted between the flanges of the side members 8 and welded in place as shown. The open side of this channel iron faces rearwardly. There is a rear cross-member 22 and this is spaced in parallelism between the transverse end member 12 and the front cross-member 20 and its open side faces downwardly. It is welded to the side channel irons 8—8 and is, of course, coplanar with 12 and 20. Suitably welded struts 24 are provided and these are vertically disposed. They are welded at their lower ends to a horizontal axle 26 supporting the rubber tired wheels 28—28. A pair of V-shaped trusses formed from strap metal are provided and these are denoted by the numerals 30. They have their forward ends welded at 32 to the front cross-member 20 and their rearward ends welded at 34 to the transverse frame member 12. The central or vertex portion 36 defines seats and the axle 26 is fitted and welded in these seats. This provides a simple, economical and stable rear wheel assembly for the rear end of the vehicle.

The front wheel assembly is one which is swivelly mounted and is joined to the frame by what may be broadly referred to as a fifth wheel connection. This means is characterized by a horizontal transversely disposed cross-member which takes the form of a channel iron 38 (see Figure 3). The open side of channel in the channel iron faces upwardly. The web portion is provided with a welded reinforcing block 40 which, like the web, is apertured to accommodate a pivoting or swivelling bolt or so-called kingpin 42. Welded to the rear flange of this angle iron 38 is a relatively short but wider angle iron 44. Also, as shown in Figure 3, a pair of forwardly diverging braces 46—46 are welded at their respective ends to the cross-member or angle iron 38 and the transverse cross-member 10 of the frame. An insert or plate 48 is interposed between and welded to the braces and cross-member 10. This provides a fairly open construction for dislodging mud and debris which might otherwise clog and interfere with the fifth wheel action. It may be stated here, that the web portion of the angle irons 38 and 44 are coplanar and smooth and provide the upper part of the fifth wheel construction; that is, the fixed part. The wheel assembly comprises an axle 50 (see Figure 5) with rubber tired wheels 52—52 mounted for free rotation on the ends of the axle. There is an inverted U-shaped bolster which comprises a downwardly opening horizontal angle iron 54 and a pair of vertical angle irons 56—56 which are welded to the angle iron 54 and are also welded to the axle 50 inwardly of the wheels 52—52. When the wheels are straight ahead the bolster, of course, underlies the cross-member or angle iron 38 and the aforementioned kingpin affords the desired pivotal connection between the parts. An angle iron draft tongue 58 is welded to the forward flange of the angle iron 54 at the center of the latter and diagonal braces 60—60 are provided and these are joined to the intermediate portion of the tongue at their forward ends and welded or otherwise joined at their rear ends to the axle in the manner shown in Figure 2. The tongue may be said to also include a rear extension 62 which is fastened to the rear flange of the angle iron 54 and underlies the relatively fixed auxiliary angle iron 44.

The vehicle may be drawn by horse power, or by hand or otherwise.

It is to be repeated here that the gist of the invention has to do with the construction of an elongated narrow platform-equipped wheeled vehicle which is specifically constructed as shown and described and wherein the essential parts are suitable lengths of strap metal for bracing purposes and channel irons which latter characterize the main frame, the steerable front truck and the support means for the rear wheel means.

It is thought that persons skilled in the art to which the invention relates will be able to obtain a clear understanding of the invention after considering the description in connection with the drawings. Therefore a more lengthy description is regarded as unnecessary.

Minor changes in the shape, size and arrangement of details coming within the field of invention claimed may be resorted to in actual practice, if desired.

Having described the invention, what is claimed as new is:

1. A vehicle comprising a horizontal frame embodying longitudinal side members and interconnecting transverse front and rear members all coplanar with each other, front wheel means situated beneath the front end of the frame and operatively joined thereto, forward and rearward rigid cross-members disposed horizontally between and secured to the side members of said frame and disposed in spaced parallelism in respect to each other and the rear transverse member of said frame, said members each being a channel-iron, the open side of the channel in said forward member facing rearwardly and the open side of the rearward cross-member facing downwardly, a pair of V-shaped trusses axffied at rear ends to the rear frame member and at their forward ends to the forward cross-member, an axle underlying the rearward cross-member and seated and secured fixedly in the respective vertex portions of said trusses, rigid vertical struts interposed between and having their lower ends secured to the end portions of said axle, the upper end portions of said struts being secured to said cross-member; and wheels mounted for rotation on the respective end portions of said axle.

2. A vehicle comprising a horizontal frame embodying longitudinal side members and transverse end members interconnecting the side members, all of said members being channel-irons, rear wheel means underlying and attached to and supporting the rear end of said frame, a cross-member interposed between the forward portion of the longitudinal channel irons and joined at its ends to the latter irons and having its open side facing upwardly, a second auxiliary channel-iron fastened to the rear flange of said primary channel-iron and having its web portion coplanar with the web portion of the primary channel-iron, an axle, front wheels mounted for rotation on the ends of said axle, an inverted U-shaped bolster, said bolster being made up of interconnected horizontal and vertical channel-irons, said vertical channel-irons being welded to said axle inwardly of the wheels, the open side of the horizontal channel-iron in said bolster facing downwardly and having its web opposed to the web portions of said primary and auxiliary channel-irons, means bolting the bolster to the primary channel iron, a tongue connected to the front flange of the horizontal channel-iron of the bolster and a tongue extension connected to the rear flange of the same channel-iron and underlying said auxiliary channel-iron.

References Cited in the file of this patent

UNITED STATES PATENTS

| Number | Name | Date |
|---|---|---|
| 1,363,245 | Gardner | Dec. 28, 1920 |
| 1,743,381 | Norman | Jan. 14, 1930 |